United States Patent
Li et al.

(10) Patent No.: US 9,086,474 B2
(45) Date of Patent: Jul. 21, 2015

(54) METHOD AND SYSTEM FOR SIMULTANEOUSLY DISPLAYING A DOPPLER IMAGE, A B-MODE IMAGE, AND A COLOR BLOOD FLOW IMAGE

(75) Inventors: Lei Li, Shenzhen (CN); Yongqiang Dong, Shenzhen (CN); Bo Yang, Shenzhen (CN)

(73) Assignee: SHENZHEN MINDRAY BIO-MEDICAL ELECTRONICS CO., LTD, Shenzhen (CN)

( * ) Notice: Subject to any disclaimer, the term of this patent is extended or adjusted under 35 U.S.C. 154(b) by 348 days.

(21) Appl. No.: 13/208,228

(22) Filed: Aug. 11, 2011

(65) Prior Publication Data

US 2012/0053461 A1 Mar. 1, 2012

(30) Foreign Application Priority Data

Aug. 26, 2010 (CN) .......................... 2010 1 0265538

(51) Int. Cl.
*A61B 8/00* (2006.01)
*G01S 7/52* (2006.01)
*G01S 15/89* (2006.01)

(52) U.S. Cl.
CPC ......... *G01S 7/52033* (2013.01); *G01S 7/52066* (2013.01); *G01S 7/52071* (2013.01); *G01S 7/52074* (2013.01); *G01S 15/8988* (2013.01); *G01S 7/52095* (2013.01)

(58) Field of Classification Search
CPC ............ G01S 7/52033; G01S 7/52066; G01S 7/52074; G01S 7/52071; G01S 7/52095; G01S 15/8988

USPC .......................................................... 600/441
See application file for complete search history.

(56) References Cited

U.S. PATENT DOCUMENTS

| | | | | |
|---|---|---|---|---|
| 5,148,808 A * | 9/1992 | Satake | ........................ | 600/441 |
| 5,476,097 A | 12/1995 | Robinson | | |
| 5,477,858 A * | 12/1995 | Norris et al. | ................... | 600/441 |
| 5,555,514 A * | 9/1996 | Ri et al. | ............................ | 708/5 |
| 5,642,732 A | 7/1997 | Wang | | |
| 5,669,387 A * | 9/1997 | Mine | ............................. | 600/455 |
| 6,213,947 B1 | 4/2001 | Phillips | | |
| 7,736,314 B2 | 6/2010 | Beach et al. | | |
| 2005/0137479 A1* | 6/2005 | Haider | ......................... | 600/440 |
| 2007/0043294 A1* | 2/2007 | Li | ................. | 600/455 |
| 2008/0156106 A1* | 7/2008 | Zhang | ........................ | 73/861.25 |
| 2009/0012398 A1* | 1/2009 | Zhang et al. | ................... | 600/453 |
| 2010/0069757 A1* | 3/2010 | Yoshikawa et al. | ............ | 600/454 |

FOREIGN PATENT DOCUMENTS

| CN | 1559346 A | 1/2005 | |
|---|---|---|---|
| CN | 101664323 A | 3/2010 | |
| WO | WO 2008/136201 | * 11/2008 | ............... A61B 8/06 |

OTHER PUBLICATIONS

Zhang, Ping et al., "Study of Autocorrelation Algorithm and Digital Accomplishment in Ultrasonic Medical Color Flow Mapping System," Chinese Journal of Medical Instrumentation, Jan. 1, 2011, pp. 1-5.

* cited by examiner

*Primary Examiner* — Bo J Peng
(74) *Attorney, Agent, or Firm* — Kory D. Christensen; Stoel Rives LLP

(57) ABSTRACT

Methods and systems for simultaneously displaying a Doppler image, a B-mode image, and a color blood flow image are provided.

16 Claims, 6 Drawing Sheets

METHOD AND SYSTEM FOR SIMULTANEOUSLY DISPLAYING A DOPPLER IMAGE, A B-MODE IMAGE, AND A COLOR BLOOD FLOW IMAGE

CROSS-REFERENCE TO RELATED APPLICATIONS

This application claims the benefit of priority of Chinese Patent Application No. 201010265538.7, filed Aug. 26, 2010, which is incorporated herein by reference in its entirety.

TECHNICAL FIELD

The present disclosure relates generally to medical ultrasonic imaging.

SUMMARY OF THE INVENTION

Disclosed herein are methods and systems for simultaneously displaying a Doppler image and a color blood flow image, as well as methods and systems for simultaneously displaying a Doppler image, a B-mode image, and a color blood flow image in an ultrasonic imaging system.

DETAILED DESCRIPTION

Figure 1:
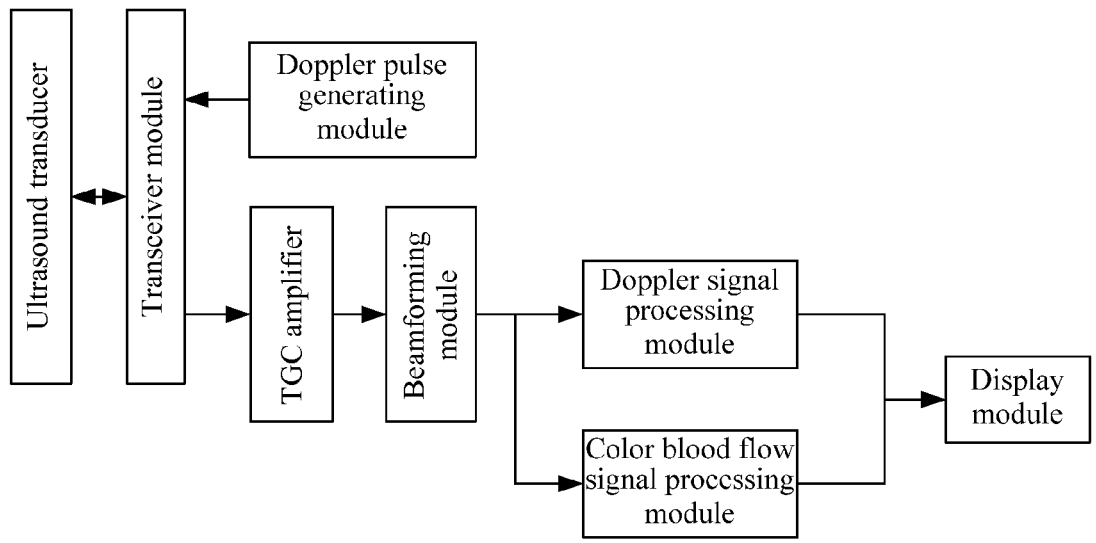
FIG. 1 is a block diagram of a system for simultaneously displaying a Doppler image and a color blood flow image.

To generate a pulse wave Doppler image, an ultrasound front-end, such as a probe, transmits an ultrasonic pulse signal into human target tissue at fixed time intervals to detect Doppler frequency shift information and acquires a frequency spectrum or a power spectrum of the human target tissue in real time. After specific processing of the frequency shift information, a Doppler frequency spectrum diagram is displayed, which includes information related to the speed of blood flow or moving tissue.

For a color blood flow image, dynamic information related to blood cells in a blood flow is calculated. Three primary colors (red, blue, and green), and brightness of the three primary colors, are adjusted according to the direction of movement, speed, and dispersion of the blood cells, which are superposed on a two-dimensional B-mode scanning image to display the blood flow information.

Imaging of a Doppler frequency spectrum image includes a single-task mode and a multi-task mode. In the single-task mode (i.e., only one type of scanning pulse is transmitted), tissue and blood vessels are first positioned through a B-mode imaging and a color blood flow imaging mode (also referred to as C-mode), which are then switched to a Doppler imaging mode to acquire Doppler frequency spectrum information. When switched to Doppler imaging mode, the B-mode image and the color blood flow image are in a frozen state, and an operator must ensure that no movement occurs between a probe and the human body with his/her experience and skills to guarantee that the blood vessels do not depart from a sampling location. In the multi-task mode (i.e., multiple types of scanning pulses are transmitted simultaneously), a Doppler frequency spectrum imaging mode and a B-mode imaging mode or a color blood flow imaging mode are both operating simultaneously, and an operator cannot only position blood vessels according to a B-mode image or a color blood flow image, but also acquire Doppler frequency spectrum information for a location of interest.

The multi-task mode has the advantage of accurate positioning. Nevertheless, it has some defects. For example, the frame rate of two-dimensional images decreases in the multi-task mode, especially in a tri-task mode, in which the B-mode imaging mode, the color blood flow imaging mode, and the Doppler frequency spectrum imaging mode are all in operation. Additionally, when a Doppler frequency spectrum image has a large speed detection range, Doppler frequency spectrum data is interrupted by B-mode image data and color blood flow image data so that gap filling is required.

In view of the above, the conventional single-task mode is difficult to operate and has poor positioning accuracy, and the conventional multi-task mode has decreased frame rate and decreased quality. The present disclosure is directed to a method and a system for simultaneously displaying ultrasound Doppler single-task images and ultrasound Doppler multi-task images. In one embodiment, a method includes: switching a transceiver module into a transmitting state; transmitting a Doppler scanning pulse; switching the transceiver module into a receiving state; receiving an ultrasonic echo of the scanning pulse; converting the ultrasonic echo into an electric signal; performing Time Gain Compensation (TGC) amplification on the converted electric signal; performing beamforming on the amplified electric signal; dividing the signal obtained after the beamforming into two parts, where one part undergoes Doppler signal processing to acquire Doppler frequency spectrum data, and the other part undergoes color blood flow signal processing to acquire color blood flow image data; sending the Doppler frequency spectrum data and the color blood flow image data to a display module; and displaying the Doppler frequency spectrum data and the color blood flow image data synchronously.

A system for simultaneously displaying a Doppler image and a color blood flow image may include: a Doppler pulse generating module, a transceiver module, an ultrasound transducer, a TGC amplifier, a beamforming module, a Doppler signal processing module, a color blood flow signal processing module, and a display module. In one embodiment, the Doppler pulse generating module, transceiver module, and ultrasound transducer are connected in sequence to form a pulse transmitting loop; the ultrasound transducer, transceiver module, TGC amplifier, and beamforming module are connected in sequence to form a pulse receiving loop; and the Doppler signal processing module and the color blood flow signal processing module are connected in parallel between the beamforming module and the display module.

A method for simultaneously displaying a B-mode image, Doppler image, and color blood flow image may include: switching a transceiver module into a transmitting state; transmitting a B-mode scanning pulse and a Doppler scanning pulse alternately according to a time sequence; switching the transceiver module into a receiving state; receiving ultrasonic echoes of the scanning pulses; converting the ultrasonic echoes into an electric signal; performing TGC amplification on the converted electric signal; performing B-mode signal beamforming on the B-mode ultrasonic echo; performing Doppler signal beamforming on the Doppler ultrasonic echo; sending a signal resulting from the B-mode signal beamforming to a B-mode signal processing module to acquire B-mode image data; dividing a signal resulting from the Doppler signal beamforming into two parts, where one part undergoes Doppler signal processing to acquire Doppler frequency spectrum data, and the other part undergoes color blood flow signal processing to acquire color blood flow image data; sending the B-mode image data, the Doppler frequency spectrum data, and the color blood flow image data to a display module; and synchronously displaying the B-mode image data, the Doppler frequency spectrum data, and the color blood flow image data.

A system for simultaneously displaying a B-mode image, a Doppler image, and a color blood flow image may include a B-mode pulse and Doppler pulse generating module, a transceiver module, an ultrasound transducer, a B-mode signal beamforming module, a B-mode signal processing module, a Doppler signal beamforming module, a Doppler signal processing module, a color blood flow signal processing module, and a display module. In one embodiment, the B-mode pulse and Doppler pulse generating module, the transceiver module, and the ultrasound transducer are connected in sequence to form a pulse transmitting loop; the ultrasound transducer, the transceiver module, the B-mode signal beamforming module, and the B-mode signal processing module are connected in sequence to form a B-mode signal receiving loop; the ultrasound transducer, the transceiver module, the Doppler signal beamforming module, and the Doppler signal processing module are connected in sequence to form a Doppler signal receiving loop; the color blood flow signal processing module is connected to the Doppler signal beamforming module; and the B-mode signal processing module, the Doppler signal processing module, and the color blood flow signal processing module are all connected to the display module.

Based on multi-beam technology, one embodiment of the present disclosure uses Doppler signals to calculate blood flow information near a sampling location, so as to display a Doppler image and a color blood flow image simultaneously without transmitting additional pulse signals. In this way, an operator can capture a Doppler frequency spectrum more easily without degrading the image quality and will be more confident in the diagnosis.

The present disclosure is described in further detail below with reference to the accompanying drawings.

FIG. 1 is a block diagram of a system for simultaneously displaying an ultrasound Doppler frequency spectrum image and an ultrasound color blood flow image. In one embodiment, an ultrasound system performs transmission in a single-task transmitting state. By applying the system, dual-task display in a single-task mode can be realized, that is, both a Doppler image and a color blood flow image can be acquired and displayed simultaneously by transmitting only a Doppler scanning pulse. In one embodiment, the system includes a Doppler pulse generating module, a transceiver module, an ultrasound transducer (serving as a probe), a TGC amplifier, a beamforming module, a Doppler signal processing module, a color blood flow signal processing module, and a display module.

In one embodiment, the Doppler pulse generating module, the transceiver module, and the ultrasound transducer are connected in sequence to form a pulse transmitting loop. The ultrasound transducer, the transceiver module, the TGC amplifier, and the beamforming module are connected in sequence to form a pulse receiving loop. The Doppler signal processing module and the color blood flow signal processing module are connected in parallel between the beamforming module and the display module.

Figure 10:
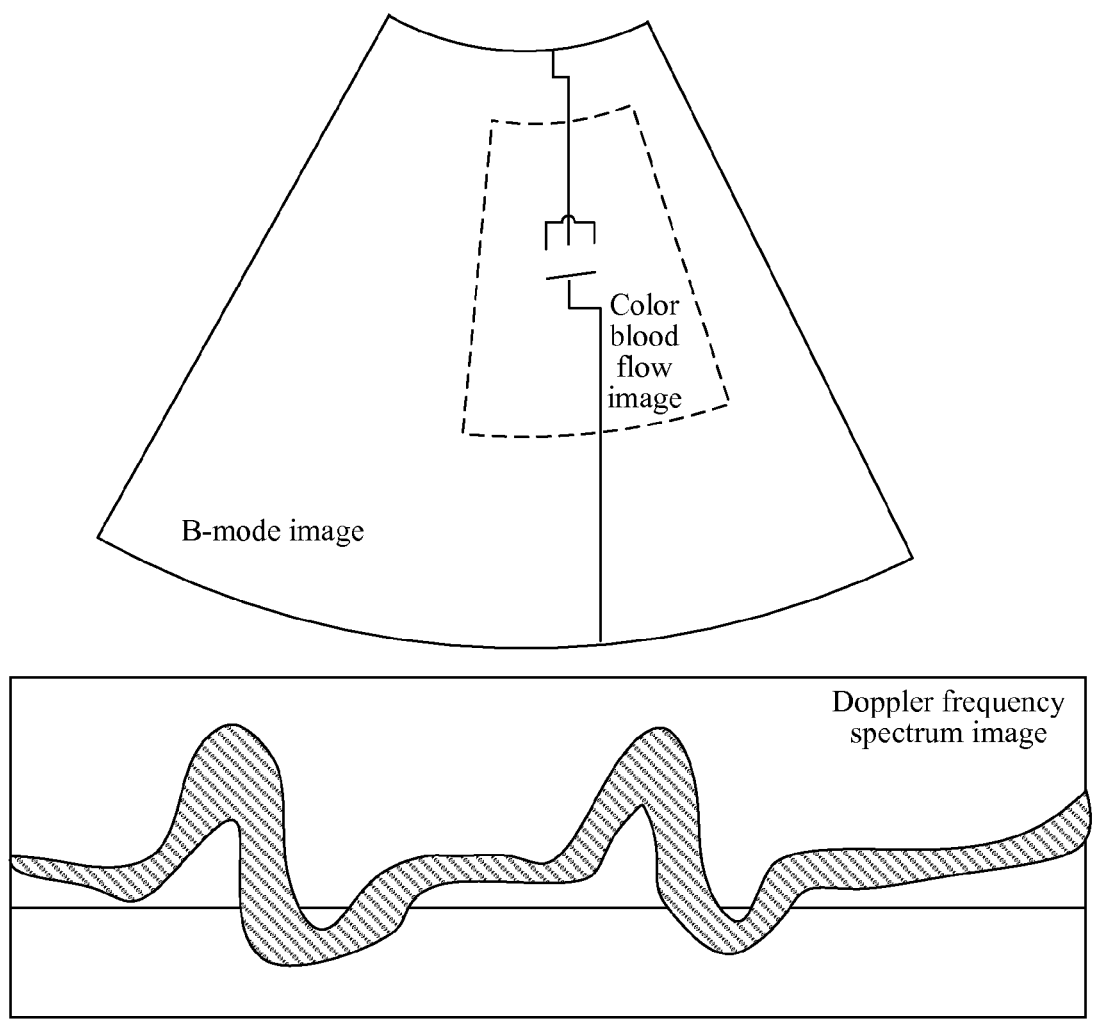
FIG. 10 is a schematic view of simultaneously displaying an ultrasound Doppler image and an ultrasonic color blood flow image.

The Doppler pulse generating module, in one configuration, controls a shape of a transmission pulse, a time delay, and array elements participating in transmission (the array elements chosen for transmission form a transmitting aperture). The transceiver module transmits a scanning pulse to the ultrasound transducer to generate ultrasound waves and focus transmitted ultrasound waves on a preset focus position on a preset scan line. An ultrasonic echo returned from the tissue is received by the array elements of the ultrasound transducer and is converted by the array elements into an electric signal. The electric signal is amplified by the TGC amplifier to compensate for ultrasonic attenuation at different depths, and is then sent to the beamforming module to adjust the time delay of the echo of each array element and perform apodization, so as to increase a signal-to-noise ratio of a currently received scan line echo signal. After beamforming, the signal is divided into two parts for processing. One part is sent to the Doppler signal processing module to acquire Doppler frequency spectrum data, and the other part is sent to the color blood flow signal processing module to acquire color blood flow image data. Finally, the color blood flow image data and the Doppler frequency spectrum data are combined by the display module to form resultant data to be synchronously displayed on a display. Meanwhile, fixed B-mode image data may be integrated during the display process, as shown in FIG. 10.

Figure 2:
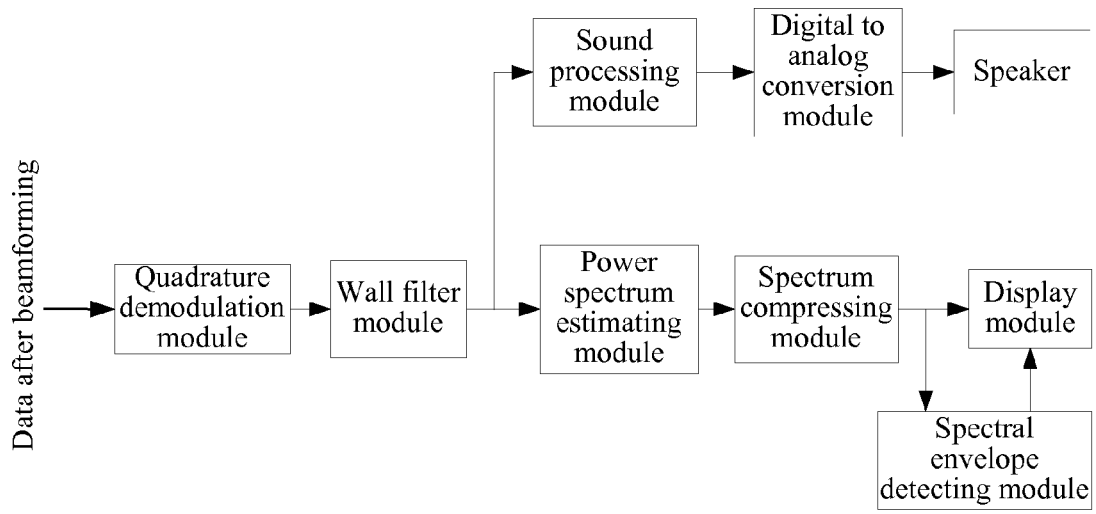
FIG. 2 is a block diagram of a system for Doppler signal processing.

As shown in FIG. 2, the Doppler signal processing module may include a quadrature demodulation module, a wall filter module, a power spectrum estimating module, and a spectrum compressing module, which are connected in sequence. The Doppler signal processing module may further include a spectral envelope detecting module. An input end of the spectral envelope detecting module may be connected to the spectrum compressing module, and an output end of the spectral envelope detecting module may be connected to the display module of the system.

The Doppler signal processing module may further include a sound processing module, a digital to analog conversion module, and a speaker connected in sequence. An input end of the sound processing module may be connected to an output end of the wall filter module.

In one embodiment, a method for processing ultrasound Doppler signals is as follows. After beamforming, an ultrasonic echo signal forms a radio frequency echo signal, which is decomposed by the quadrature demodulation module into two component signals: an in-phase component I signal and a quadrature component Q signal. Thereafter, wall filtering is performed. The wall filter module is a high-pass filter, and can filter out noise created by tissue being still or moving slowly. After processing, the component signals I and Q mainly include an echo caused by movement of red blood cells, which is sent to the power spectrum estimating module, which uses transforms, such as a Fast Fourier Transform (FFT), to estimate a power spectrum. A dynamic range of the estimated power spectrum is too wide so that each estimated power spectrum needs compression processing to be compressed into a grayscale display range. A Doppler frequency spectrum diagram eventually displayed on a screen represents intensity of a power spectrum at a time and a speed, that is, of a frequency offset. The system may further include an automatic envelope detecting module for analyzing data after the spectrum compression so as to automatically trace changes of a blood flow peak speed and a blood flow average speed with time, and display the changes on the Doppler frequency spectrum diagram in real time. In addition, I and Q data, after the wall filtering, may also be sent to the sound processing module to form forward blood flow sound data and reverse blood flow sound data, which are sent to the speaker after being converted by the digital to analog conversion module, respectively, to produce a forward blood flow sound and a reverse blood flow sound.

Figure 3:
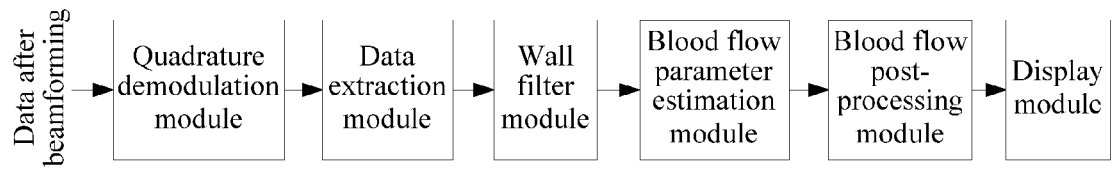
FIG. 3 is a block diagram of a system for color blood flow signal processing.

Referring to FIG. 3, the color blood flow signal processing module, in one embodiment, includes a quadrature demodulation module, a data extraction module, a wall filter module, a blood flow parameter estimation module, and a blood flow post-processing module connected in sequence. The blood flow post-processing module is connected to the display module of the system.

In one embodiment, an ultrasound color blood flow signal processing method is as follows. After beamforming, a signal is decomposed by the quadrature demodulation module before entering the data extraction module. An objective of data extraction is to make a speed detecting range of the color blood flow signal adjustable. When an extraction rate is 1, the speed detecting range of the blood flow signal is the same as that of a Doppler signal; when the extraction rate is 2, the speed detecting range of the blood flow signal is one-half of that of the Doppler signal; and so on. For data after the extraction, a strong tissue echo signal in the signal is filtered out by the wall filtering processing, and the data enters the blood flow parameter estimation module to acquire a current blood flow speed, a variance, and energy. Thereafter, the blood flow post-processing module performs frame correlation and smoothing on estimated blood flow information to improve a blood flow pattern, which is eventually output and displayed on the display module.

In view of the above, one embodiment of the present disclosure uses the Doppler echo signal to process the Doppler signal and the color blood flow signal, so as to display the Doppler information and the blood flow information simultaneously, thereby effectively improving usability of ultrasound diagnostic equipment.

Figure 4:
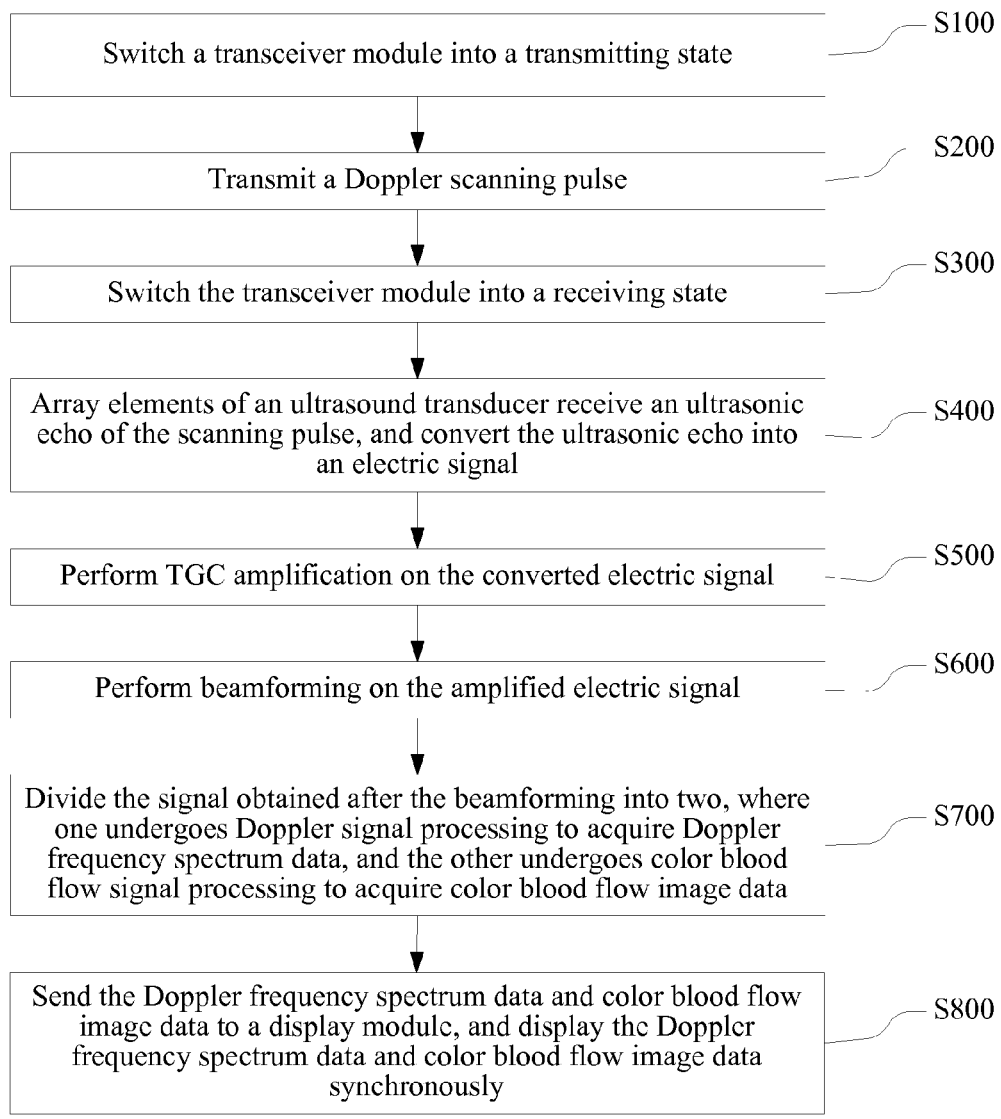
FIG. 4 is a flow chart of a method for simultaneously displaying a Doppler image and a color blood flow image.

FIG. 4 is a flow chart of a method for simultaneously displaying a Doppler image and a color blood flow image, which may include the following steps.

In Step S100, a transceiver module is switched into a transmitting state.

In Step S200, a Doppler scanning pulse is transmitted.

In Step S300, the transceiver module is switched into a receiving state.

In Step S400, an ultrasonic echo of the scanning pulse is received and is converted into an electric signal.

In Step S500, TGC amplification is performed on the converted electric signal.

In Step S600, beamforming is performed on the amplified electric signal.

In Step S700, the signal obtained after the beamforming is divided into two parts; one part undergoes Doppler signal processing to acquire Doppler frequency spectrum data, and the other part undergoes color blood flow signal processing to acquire color blood flow image data.

In Step S800, the Doppler frequency spectrum data and the color blood flow image data are sent to a display module to be synchronously displayed.

Obtaining the signal after the beamforming undergoing Doppler signal processing to acquire the Doppler frequency spectrum data in Step S700 may include the following steps.

In Step S7100, quadrature demodulation is performed on the Doppler frequency spectrum data to acquire an in-phase component signal and a quadrature component signal.

In Step S7101, range gating is performed on the in-phase component signal and the quadrature component signal, respectively.

In Step S7102, wall filtering is performed on a signal resulting from the range gating.

In Step S7103, a power spectrum of the signal resulting from the wall filtering is estimated through a Fourier transform.

In Step S7104, compression processing is performed on the estimated power spectrum to compress the estimated power spectrum into a grayscale display range.

In Step S7106, the Doppler frequency spectrum data is sent to the display module.

After the step of performing the compression processing on the estimated power spectrum, the method may further include the following steps.

In Step S7105, automatic envelope detection is performed on the compressed power spectrum data to automatically trace changes of a blood flow peak speed and a blood flow average speed with time.

In addition, after Step S7102, the method may further include a procedure of indicating blood flow directions by sounds:

In Step S7113, sound analysis processing is performed on the data after the wall filtering to form forward blood flow sound data and reverse blood flow sound data.

In Step S7114, the forward blood flow sound data and the reverse blood flow sound data undergo digital to analog conversion, and are sent to a speaker to produce a forward blood flow sound and a reverse blood flow sound.

Obtaining the signal after the beamforming undergoing color blood flow signal processing to acquire the color blood flow image data in Step S700 may include the following steps.

In Step S7200, quadrature demodulation is performed on the Doppler frequency spectrum data to acquire an in-phase component signal and a quadrature component signal.

In Step S7201, data extraction is performed on the in-phase component signal and the quadrature component signal.

In Step S7202, wall filtering is performed on data resulting from the extraction.

In Step S7203, blood flow parameter estimation is performed on the data after the wall filtering to acquire a current blood flow speed, a variance, and energy.

In Step S7204, frame correlation and smoothing are performed on estimated blood flow information.

In Step S7205, the color blood flow image data is sent to the display module.

In one embodiment, quadrature decomposition is performed on the Doppler frequency spectrum data to eventually acquire the two component signals: the in-phase component I signal and the quadrature component Q signal. Range gating is performed on the component signals I and Q respectively, that is, the component signals I and Q are accumulated in a specific time period, where the accumulation time period and the transmission pulse of pulse Doppler are both selected by an operator according to an actual situation. An advantage of range gating is that information related to a feature area can be acquired intentionally. For example, an image depth ranges from 1 centimeter (cm) to 8 cm, and a depth of a location to be detected ranges from 5 cm to 6 cm. In this case signals corresponding to the location of a depth ranging from 5 cm to 6 cm can be superposed by range gating to avoid acquiring a large amount of unnecessary information.

Figure 5:
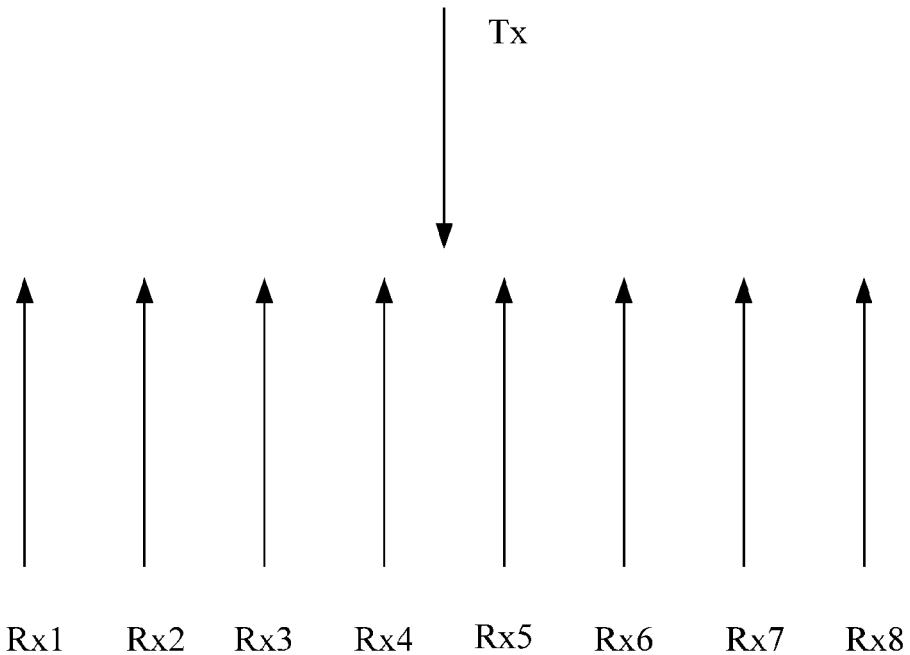
FIG. 5 is a schematic view of wide-beam transmission and multi-beam reception.

In order to increase the width of a color blood flow data sampling frame, the system may use a multi-beam technology to focus different received beams respectively for a transmitted Doppler pulse signal, so as to acquire information for multiple received beams to widen a measurement range. As shown in FIG. 5, Tx represents a transmitted beam, and Rx1 to Rx8 represent transmitted beams caused by the transmitted beam Tx at different locations. In addition, in order to enable a small difference between signal-to-noise ratios of the received beams of the multiple beams, the method may further adopt a wide-beam transmission technology to equalize the signal-to-noise ratios.

Figure 6:
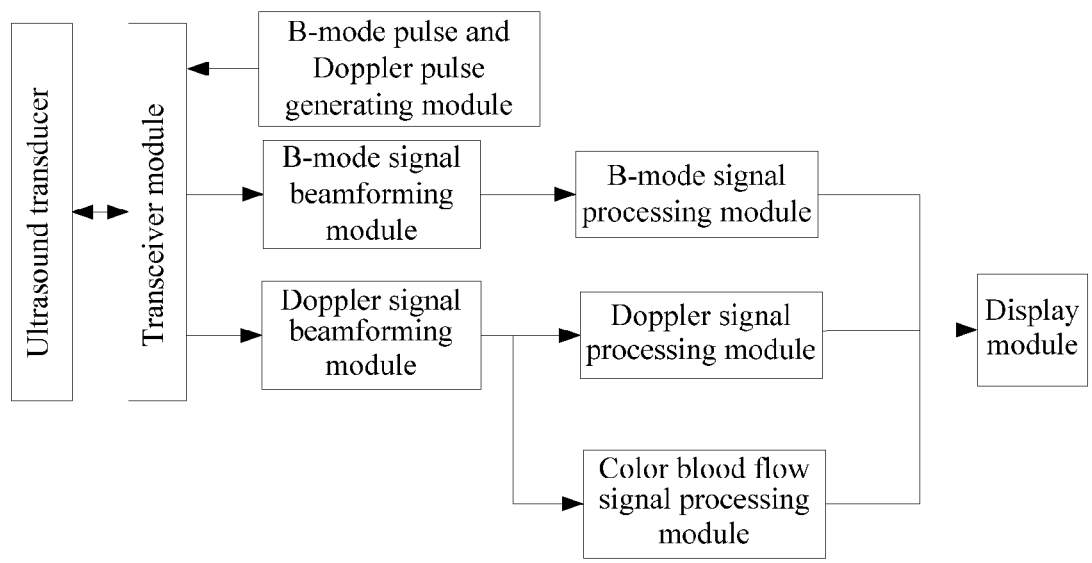
FIG. 6 is a block diagram of a system for simultaneously displaying a B-mode image, a Doppler image, and a color blood flow image.

According to another implementation, when a Doppler image and a B-mode image are displayed simultaneously, a color blood flow signal processing module for processing a Doppler signal is added so that in a dual-task scanning mode, that is, when a B-mode pulse signal and a Doppler pulse signal are transmitted alternately at the same time, a tri-task image display effect is achieved, i.e., a B-mode image, a Doppler image, and a color blood flow image are displayed simultaneously. This system is referred to as a dual-task transmission/tri-task display system and is shown in FIG. 6.

In one embodiment, the dual-task transmission/tri-task display system includes a B-mode pulse and Doppler pulse generating module, a transceiver module, an ultrasound transducer, a B-mode signal beamforming module, a B-mode signal processing module, a Doppler signal beamforming module, a Doppler signal processing module, a color blood flow signal processing module, and a display module.

The B-mode pulse and Doppler pulse generating module, the transceiver module, and the ultrasound transducer may be connected in sequence to form a pulse transmitting loop. The ultrasound transducer, the transceiver module, the B-mode signal beamforming module, and the B-mode signal processing module may be connected in sequence to form a B-mode signal receiving loop. The ultrasound transducer, the transceiver module, the Doppler signal beamforming module, and the Doppler signal processing module may be connected in sequence to form a Doppler signal receiving loop. The color blood flow signal processing module may be connected to the Doppler signal beamforming module. The B-mode signal processing module, the Doppler signal processing module, and the color blood flow signal processing module may all be connected to the display module.

In one embodiment, the ultrasound system performs transmission in a dual-task transmitting state, so as to rapidly switch a scanning mode between two-dimensional B-mode scanning and Doppler scanning. In this way, the B-mode scanning and the Doppler scanning are performed in different time periods. During receiving, the system controls different parameters to perform TGC and beamforming respectively. A signal related to a B-mode image enters the B-mode signal beamforming module and the B-mode signal processing module to acquire B-mode image data, and the B-mode image data is sent to the display module. A signal related to a Doppler image and a signal related to a color blood flow image may enter the same Doppler signal beamforming module; the signal related to the Doppler image may enter the Doppler signal processing module to acquire Doppler frequency spectrum data; the signal related to the color blood flow image may enter the color blood flow signal processing module to acquire color blood flow image data; and the Doppler frequency spectrum data and the color blood flow image data may be sent to the display module simultaneously. Eventually, the B-mode image data, the color blood flow image data, and the Doppler frequency spectrum data are combined by the display module to form resultant data to be synchronously displayed on a screen.

Figure 7:
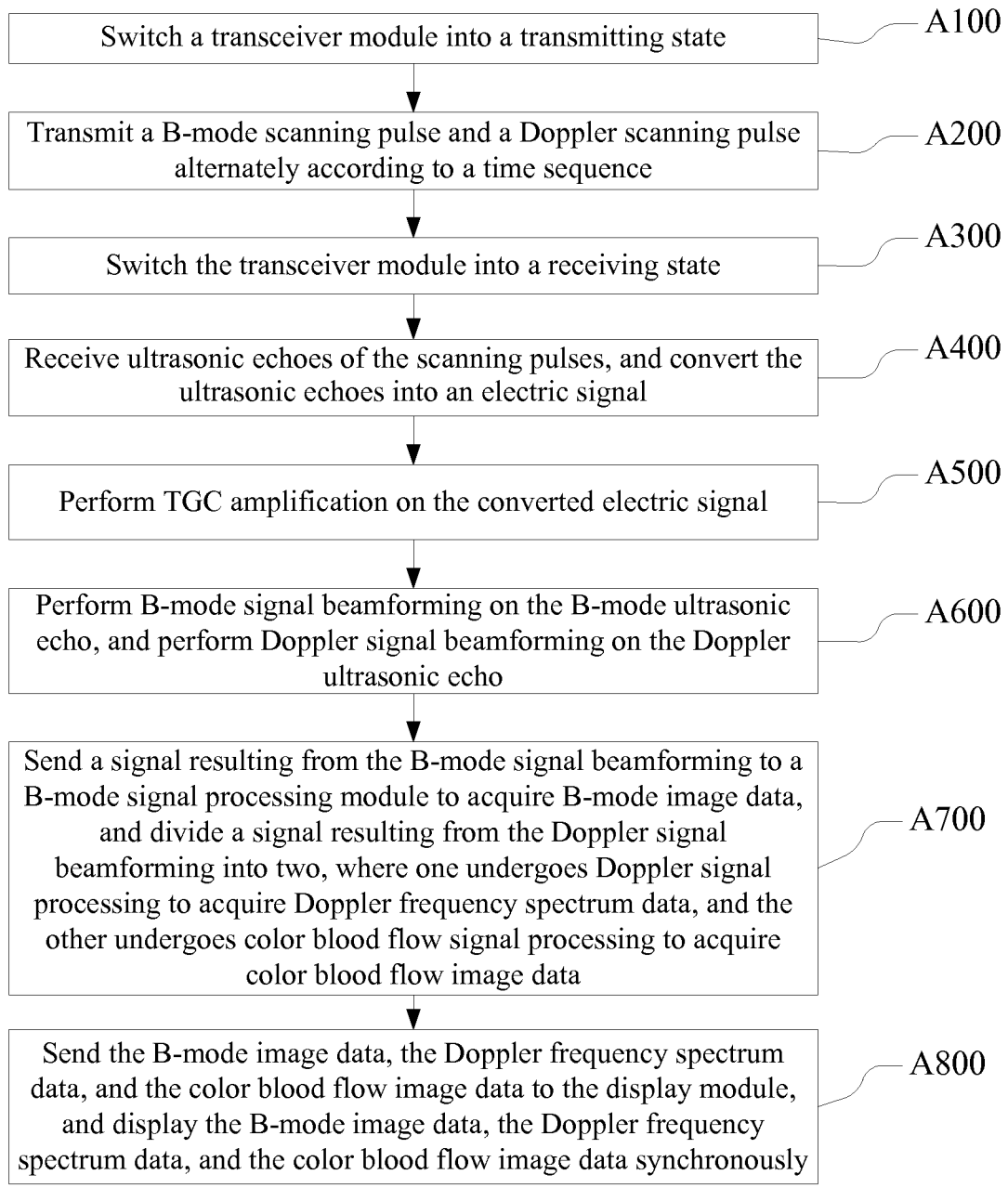
FIG. 7 is a flow chart of a method for simultaneously displaying a B-mode image, a Doppler image, and a color blood flow image.

FIG. 7 is a flow chart of a method for simultaneously displaying a B-mode image, a Doppler image, and a color blood flow image. In one embodiment, the method includes the following steps.

In Step A100, a transceiver module is switched into a transmitting state.

In Step A200, a B-mode scanning pulse and a Doppler scanning pulse are transmitted alternately according to a time sequence.

In Step A300, the transceiver module is switched into a receiving state.

In Step A400, ultrasonic echoes of the scanning pulses are received and are converted into an electric signal.

In Step A500, TGC amplification is performed on the converted electric signal.

In Step A600, B-mode signal beamforming is performed on the B-mode ultrasonic echo, and Doppler signal beamforming is performed on the Doppler ultrasonic echo.

In Step A700, a signal resulting from the B-mode signal beamforming is sent to the B-mode signal processing module to acquire B-mode image data, and a signal resulting from the Doppler signal beamforming is divided into two parts: one part undergoes Doppler signal processing to acquire Doppler frequency spectrum data, and the other part undergoes color blood flow signal processing to acquire color blood flow image data.

In Step A800, the B-mode image data, the Doppler frequency spectrum data, and the color blood flow image data are sent to the display module to be displayed synchronously.

During dual-task transmission, the system may work in two dual-task scanning states according to the size of an image area selected by an operator and requirements of a Doppler speed detecting range.

Figure 8:
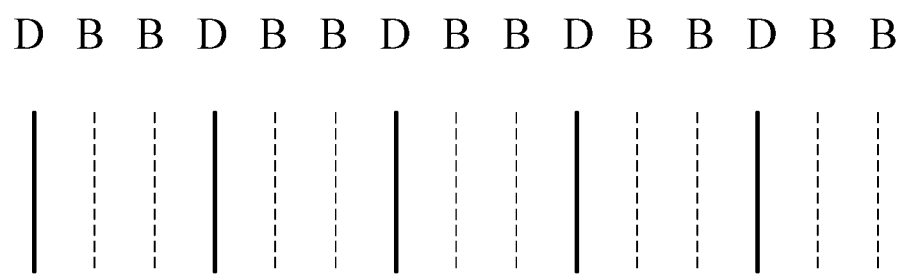
FIG. 8 is a first scanning mode for simultaneously displaying an ultrasound B-mode image, an ultrasound Doppler image, and an ultrasound color blood flow image.

In one scanning state, as shown in FIG. 8, a time sequence for transmitting B-mode scanning pulses B and Doppler scanning pulses D is: a Doppler scanning pulse D is transmitted first, where a time interval between every two Doppler scanning pulses D is fixed; then, at least one B-mode scanning pulse B is inserted according to the time interval between the adjacent two Doppler scanning pulses; all B-mode scanning pulses are combined to complete scanning of a B-mode image; and all Doppler scanning pulses are combined to complete scanning of a Doppler image.

In one embodiment, a time interval of scan lines of Doppler pulses is fixed and is determined by the speed detecting range, which is shown in the following equation:

$$t = C/(4f \times S)$$

where t is the time interval, C is the speed of sound, f is a current transmission frequency, and S is a maximum value of a speed detecting range selected by a user.

Scan lines of a B-mode scanning pulses may be inserted between adjacent Doppler pulse scan lines, and all B-mode scan lines may be combined to complete scanning of a B-mode image, which is applicable when requirements on the speed detection range are not high. In this scanning mode, Doppler signal processing and color blood flow signal processing are the same as those in the single-task mode.

Figure 9:
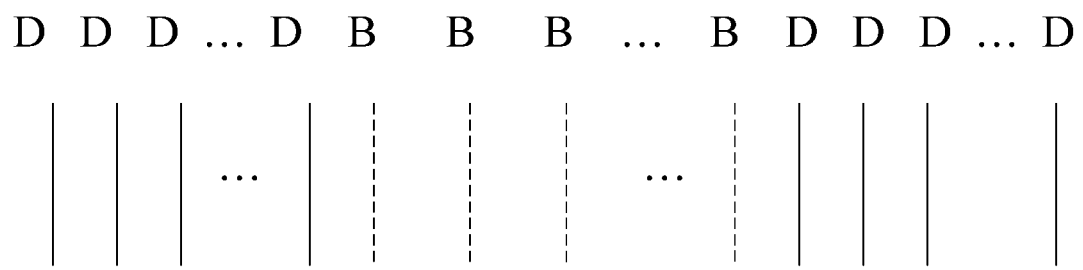
FIG. 9 is a second scanning mode for simultaneously displaying an ultrasound B-mode image, an ultrasound Doppler image, and an ultrasound color blood flow image.

In another scanning state, as shown in FIG. 9, a time sequence for transmitting B-mode scanning pulses and Doppler scanning pulses is: a segment of Doppler scanning pulses D is transmitted first, and a period of time is selected from the scanning time for completing a Doppler image, in which B-mode scanning pulses B are transmitted instead of the Doppler scanning pulses.

In one embodiment, the system first scans the Doppler pulse signals for a period of time and then scans the B-mode pulse signals for a period of time, which is applicable when requirements on the speed detection range are high. In this case, when the B-mode image scanning is performed, Doppler signals are lost because the Doppler scanning is interrupted, which is called a gap. Within the gap, no Doppler signal exits. At this time, if conventional Doppler signal processing is performed, intermittence of, and interference on, the Doppler image may increase, and, meanwhile, the Doppler sound may also be interrupted. Therefore, the Doppler signal processing and the color blood flow signal processing of the system may have to be adjusted accordingly. For Doppler signals, a method of filling the gap may be adopted to compensate for visual discontinuity of a Doppler image or acoustic discontinuity of a Doppler sound caused by the gap. For color blood flow signals, during signal processing, normal continuous Doppler signals of a non-gap segment may be used to acquire correct color blood flow image data.

While specific embodiments and applications of various methods and systems have been illustrated and described, it is to be understood that the invention claimed hereinafter is not limited to the precise configuration and components disclosed. Various modifications, changes, and variations apparent to those of skill in the art may be made in the arrangement, operation, and details of the methods and systems disclosed.

Furthermore, the methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified without departing from the scope of the invention as claimed.

The embodiments disclosed may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments of the present invention may also be provided as a computer program product including a non-transitory computer-readable medium having stored thereon instructions that may be used to program a computer (or other electronic device) to perform processes described herein. The computer-readable medium may include, but is not limited to, floppy diskettes, optical disks, CD-ROMs, DVD-ROMs, ROMs, RAMs, EPROMs, EEPROMs, magnetic or optical cards, or other type of media suitable for storing electronic instructions.

Those of skill in the art will appreciate that the various illustrative logical blocks, modules, circuits, and algorithm steps described in connection with the embodiments disclosed herein may be implemented as electronic hardware, computer software, or combinations of both. To illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention as claimed hereinafter.

What is claimed is:

1. A method for simultaneously displaying a Doppler image and a color blood flow image, comprising:
   switching a transceiver module into a transmitting state;
   transmitting a Doppler scanning pulse via an ultrasound transducer;
   switching the transceiver module into a receiving state;
   receiving an ultrasonic echo of the scanning pulse and converting the ultrasonic echo into an electric signal via the ultrasound transducer;
   performing Time Gain Compensation (TGC) amplification on the converted electric signal via a Time Gain Compensation (TGC) amplifier;
   performing beamforming on the amplified electric signal via a beamforming module;
   performing Doppler signal processing on the signal obtained by the beamforming to acquire Doppler frequency spectrum data via a Doppler signal processing module;
   performing color blood flow signal processing on the same signal which is used to acquire the Doppler frequency spectrum data to acquire color blood flow image data via a color blood flow signal processing module; and
   sending the acquired Doppler frequency spectrum data and the color blood flow image data to a display module, and synchronously displaying the Doppler frequency spectrum data and the color blood flow image data via the display module.

2. The method of claim 1, wherein the Doppler signal processing comprises:
   performing quadrature demodulation on the signal obtained after the beamforming to acquire an in-phase component signal and a quadrature component signal;
   performing range gating on the in-phase component signal and the quadrature component signal, respectively;
   performing wall filtering on a signal resulting from the range gating;
   estimating a power spectrum of the signal after the wall filtering; and
   performing compression processing on the estimated power spectrum to compress the estimated power spectrum into a grayscale display range, so as to acquire the Doppler frequency spectrum data capable of being displayed.

3. The method of claim 2, wherein, after performing compression processing on the estimated power spectrum, the method further comprises:
   performing automatic envelope detection on the compressed power spectrum data to automatically trace changes of a blood flow peak speed and a blood flow average speed with time.

4. The method of claim 2, further comprising:
   performing sound analysis processing on the data after the wall filtering to form forward blood flow sound data and reverse blood flow sound data; and
   performing digital to analog conversion on the forward blood flow sound data and the reverse blood flow sound data to produce a forward blood flow sound and a reverse blood flow sound.

5. The method of claim 2, wherein the wall filtering is a high-pass filtering.

6. The method of claim 1, wherein performing the color blood flow signal processing comprises:
- performing quadrature demodulation on the signal obtained after the beamforming to acquire an in-phase component signal and a quadrature component signal;
- performing data extraction on the in-phase component signal and the quadrature component signal;
- performing wall filtering on data resulting from the extraction;
- performing blood flow parameter estimation on the data after the wall filtering to acquire a current blood flow speed, a variance, and energy; and
- performing frame correlation and smoothing on estimated blood flow information to acquire the color blood flow image data.

7. The method of claim 6, wherein, before the data extraction is performed, range gating is performed on the in-phase component signal and the quadrature component signal respectively.

8. The method of claim 1, wherein the scanning pulses are wide beams.

9. The method of claim 1, wherein the ultrasonic echo is received by using a multi-beam technology.

10. A method for simultaneously displaying a B-mode image, a Doppler image, and a color blood flow image, comprising:
- switching a transceiver module into a transmitting state;
- transmitting a B-mode scanning pulse and a Doppler scanning pulse alternately according to a time sequence via an ultrasound transducer;
- switching the transceiver module into a receiving state;
- receiving ultrasonic echoes of the scanning pulses and converting the ultrasonic echoes into an electric signal via the ultrasound transducer;
- performing Time Gain Compensation (TGC) amplification on the converted electric signal via a Time Gain Compensation (TGC) amplifier;
- performing B-mode signal beamforming on a B-mode ultrasonic echo via a B-mode signal beamforminq module and performing Doppler signal beamforming on a Doppler ultrasonic echo via a Doppler signal beamforminq module;
- sending a signal resulting from the B-mode signal beamforming to a B-mode signal processing module to acquire B-mode image data;
- performing Doppler signal processing on a signal obtained by the Doppler signal beamforming to acquire Doppler frequency spectrum data via a Doppler signal processing module;
- performing color blood flow signal processing on the same signal which is used to acquire the Doppler frequency data to acquire color blood flow image data via a color blood flow signal processing module; and
- sending the B-mode image data, the Doppler frequency spectrum data, and the color blood flow image data to the display module, and synchronously displaying the B-mode image data, the Doppler frequency spectrum data, and the color blood flow image data via the display module.

11. The method of claim 10, wherein a time sequence for transmitting B-mode scanning pulses and Doppler scanning pulses comprises: transmitting the Doppler scanning pulses first, where a time interval between every two Doppler scanning pulses is fixed; then inserting at least one B-mode scanning pulse according to the time interval between the adjacent two Doppler scanning pulses; combining all of the B-mode scanning pulses to complete scanning of a B-mode image; and combining all of the Doppler scanning pulses to complete scanning of a Doppler image.

12. The method of claim 10, wherein a time sequence for transmitting B-mode scanning pulses and Doppler scanning pulses comprises: transmitting a segment of the Doppler scanning pulses first, and a period of time is selected from scanning time for completing a Doppler image for transmitting the B-mode scanning pulses instead of the Doppler scanning pulses.

13. The method of claim 12, wherein, for processing of Doppler signals, information of interrupted scanning pulses is estimated according to neighboring Doppler scanning pulses, so as to acquire normal continuous Doppler signals.

14. The method of claim 12, wherein, for processing of color blood flow signals, normal continuous Doppler signals of a non-gap segment are selected for processing, so as to acquire a correct color blood flow image.

15. The method of claim 12, wherein the scanning pulses are wide beams.

16. The method of claim 12, wherein the ultrasonic echoes are received by using a multi-beam technology.

* * * * *